United States Patent
Kanemoto (10) Patent No.: US 9,273,962 B2
(45) Date of Patent: Mar. 1, 2016

(54) PHYSICAL QUANTITY SENSOR AND ELECTRONIC DEVICE

(75) Inventor: Kei Kanemoto, Suwa (JP)

(73) Assignee: Seiko Epson Corporation (JP)

( * ) Notice: Subject to any disclaimer, the term of this patent is extended or adjusted under 35 U.S.C. 154(b) by 413 days.

(21) Appl. No.: 13/398,010

(22) Filed: Feb. 16, 2012

(65) Prior Publication Data

US 2012/0210789 A1    Aug. 23, 2012

(30) Foreign Application Priority Data

Feb. 18, 2011 (JP) ................................. 2011-033665

(51) Int. Cl.
- *G01C 19/56* (2012.01)
- *G01C 19/5719* (2012.01)
- *G01C 19/5747* (2012.01)
- *G01C 19/5733* (2012.01)

(52) U.S. Cl.
CPC ............ *G01C 19/56* (2013.01); *G01C 19/5719* (2013.01); *G01C 19/5733* (2013.01); *G01C 19/5747* (2013.01)

(58) Field of Classification Search
CPC ........................ G01C 19/5719; G01C 19/5747
USPC .......................................... 73/504.04, 504.12
See application file for complete search history.

(56) References Cited

U.S. PATENT DOCUMENTS

| 5,646,346 | A | 7/1997 | Okada |
| 5,895,850 | A | 4/1999 | Buestgens |
| 6,705,164 | B2 | 3/2004 | Willig et al. |
| 6,928,872 | B2 * | 8/2005 | Durante et al. ............ 73/504.04 |
| 2008/0276706 | A1 * | 11/2008 | Hartmann et al. ......... 73/504.04 |
| 2009/0100930 | A1 | 4/2009 | Coronato et al. |
| 2010/0037690 | A1 * | 2/2010 | Gunthner et al. .......... 73/504.04 |
| 2010/0300203 | A1 | 12/2010 | Gotoh |
| 2013/0152684 | A1 | 6/2013 | Gotoh |

FOREIGN PATENT DOCUMENTS

| JP | 2003-130648 A | 5/2003 |
| JP | 3512004 | 1/2004 |
| JP | 4047377 | 11/2007 |
| JP | 2010-276367 A | 12/2010 |

OTHER PUBLICATIONS

Extended European Search Report for Application No. EP 12 15 5738 dated Jun. 2, 2014 (8 pages).

* cited by examiner

*Primary Examiner* — John Chapman, Jr.
(74) *Attorney, Agent, or Firm* — Harness, Dickey & Pierce, P.L.C.

(57) ABSTRACT

A physical quantity sensor includes: a substrate; first and second displacement members in a spatial plane on the substrate and having rotation shafts; fixed electrodes on the substrate opposed to the first and second displacement members; a support member supporting the rotation shafts; fixing members supporting the support member via a spring unit; and a driving unit oscillating the support member in an oscillation direction. Each of the first and second displacement members shifts perpendicularly to the spatial plane around an axis of the corresponding rotation shaft. Each rotation shaft is shifted in an opposite direction from the center of gravity of the corresponding displacement member.

13 Claims, 8 Drawing Sheets

| CONDITION | INPUT | FIRST DISPLACEMENT MEMBER 20 (C1) SECOND DISPLACEMENT MEMBER 30 (C2) | THIRD DISPLACEMENT MEMBER 80 (C3) FOURTH DISPLACEMENT MEMBER 90 (C4) | OUTPUT (C1+C2)-(C3+C4) |
|---|---|---|---|---|
| A | NONE | 22, 21, 31, 32 X-Y PLANE | 82, 81, 91, 92 X-Y PLANE | OUTPUT: ZERO |
| B | X AXIS ANGULAR VELOCITY | Z, Y, X | Z, Y, X | OUTPUT: ZERO |
| C | Y AXIS ANGULAR VELOCITY | 22, 21, 31, 32 X-Y PLANE $\Omega y$ v(-X DIRECTION) Fcori | 82, 81, 91, 92 X-Y PLANE Fcori $\Omega y$ v(+X DIRECTION) | OUTPUT CORRESPONDING TO ANGULAR VELOCITY |
| D | Z AXIS ANGULAR VELOCITY | 22, 21, 31, 32 X-Y PLANE $\Omega z$ Fcori v(-X DIRECTION) | 82, 81, 91, 92 X-Y PLANE $\Omega z$ v(+X DIRECTION) Fcori | C1-C4=0 C2-C3=0 OUTPUT: ZERO |
| E | X AXIS ACCELERATION | 22, 21, 31, 32 | 82, 81, 91, 92 | OUTPUT: ZERO |
| F | Y AXIS ACCELERATION | 22, 21, 31, 32 X-Y PLANE | 82, 81, 91, 92 X-Y PLANE | C1-C3=0 C2-C4=0 OUTPUT: ZERO |
| G | Z AXIS ACCELERATION | 22, 21, 31, 32 X-Y PLANE | 82, 81, 91, 92 X-Y PLANE | C1+C2=C3+C4 OUTPUT: ZERO |

PHYSICAL QUANTITY SENSOR AND ELECTRONIC DEVICE

BACKGROUND

1. Technical Field

The present invention relates to a physical quantity sensor, and an electronic device including this physical quantity sensor.

2. Related Art

Recently, an angular velocity sensor capable of detecting an angular velocity has been widely used for a car navigation system, a video camera for attitude control such as correction of movement of the video camera during recording, or for other devices. There is a type of angular velocity sensor which detects an angular velocity around an axis within a plane where an element is disposed.

An angular velocity sensor disclosed in U.S. Patent Application Publication No. 2009/0100930 includes an annular driving mass, an anchor disposed at the center of the driving mass, a substrate to which the anchor is fixed, a pair of first mass units disposed opposed to each other in the X axis direction of the driving mass, a pair of second mass units disposed opposed to each other in the Y axis direction of the driving mass, and detection electrodes disposed on the substrate at positions opposed to the first mass units and the second mass units, respectively, all of which components included in the sensor are provided in the X-Y plane.

The angular velocity sensor having this structure detects an angular velocity produced by rotations of the seesaw-shaped first mass units or second mass units caused when a Coriolis force is generated and given thereto by an angular velocity around the X axis or the Y axis inputted by alternate and repeated rotation of the driving mass around an anchor axis extending in the Z axis direction perpendicular to the X-Y plane.

According to the angular velocity sensor disclosed in U.S. Patent Application Publication No. 2009/0100930, however, a centrifugal force is generated by the rotation of the driving mass and oscillates the seesaw-shaped detection electrodes particularly when the rotation direction changes. This oscillation of the detection electrodes generates an output even when an angular velocity is not inputted.

Therefore, such a physical quantity sensor and an electronic device including the physical quantity sensor have been demanded which can eliminate oscillation of detection electrodes at the time of driving, and avoid at least either the effect of a linear acceleration as a physical quantity producing an output other than the angular velocity, or the effect of an angular velocity around an axis other than the detection axis when the sensor is used as an angular velocity sensor, for example.

SUMMARY

An advantage of some aspects of the invention is to solve at least a part of the aforementioned problems, and the invention can be implemented as the following forms or application examples.

APPLICATION EXAMPLE 1

This application example is directed to a physical quantity sensor including: a substrate; a first displacement member and a second displacement member each of which is disposed in a spatial plane on the substrate and has a rotation shaft; fixed electrodes disposed on the substrate at positions opposed to the first displacement member and the second displacement member; a support member which supports the respective rotation shafts of the first displacement member and the second displacement member; a fixing member which supports the support member via a spring unit; and a driving unit which oscillates the support member in an oscillation direction. Each of the first displacement member and the second displacement member shifts in a direction perpendicular to the spatial plane around an axis of the corresponding rotation shaft. Each of the rotation shafts of the first displacement member and the second displacement member is disposed at a position shifted from the center of gravity of the corresponding displacement member. The shift direction of the rotation shaft of the first displacement member from the center of gravity of the first displacement member is opposite to the shift direction of the rotation shaft of the second displacement member from the center of gravity of the second displacement member.

The physical quantity sensor having this structure does not detect angular velocities inputted as noise in directions around axes other than the detection axis, but detects only an angular velocity around the detection axis when used as an angular velocity sensor, for example. Accordingly, the physical quantity sensor can perform highly accurate physical quantity detection.

APPLICATION EXAMPLE 2

This application example of the invention is directed to the physical quantity sensor of Application Example 1, wherein each of the rotation shafts is disposed in parallel with the oscillation direction of the support member.

According to this structure, the respective displacement members can easily shift in the direction perpendicular to the spatial plane on the substrate when the physical quantity sensor is used as an angular velocity sensor, for example, receives an angular velocity around the detection axis. Accordingly, the physical quantity sensor can perform highly accurate physical quantity detection.

APPLICATION EXAMPLE 3

This application example of the invention is directed to the physical quantity sensor according to Application Example 1 or 2, wherein the first and second displacement members are symmetrically disposed.

According to this structure, the absolute values of the capacitances of the displacement members are equalized. Thus, the displacement can be detected based on differential detection.

APPLICATION EXAMPLE 4

This application example of the invention is directed to a physical quantity sensor including: a substrate; and a first oscillator and a second oscillator each of which is disposed in a spatial plane on the substrate. The first oscillator includes a first displacement member and a second displacement member each of which has a rotation shaft, and a first support member which supports the respective rotation shafts of the first displacement member and the second displacement member. The second oscillator includes a third displacement member and a fourth displacement member each of which has a rotation shaft, and a second support member which supports the respective rotation shafts of the third displacement member and the fourth displacement member. The physical quantity sensor further includes fixed electrodes disposed on the substrate at positions opposed to the first through fourth displacement members, a fixing member which supports the first support member and the second support member via a spring unit, and a driving unit which oscillates the first support member and the second support member. The first oscillator and the second oscillator oscillate in directions opposite to each other. Each of the first through fourth displacement members shifts in a direction perpendicular to the spatial plane around an axis of the corresponding rotation shaft. Each of the rotation shafts of the first through fourth displacement members is disposed at a position shifted from the center of gravity of the corresponding displacement member. The shift direction of the rotation shaft of the first displacement member from the center of gravity of the first displacement member is opposite to the shift direction of the rotation shaft of the second displacement member from the center of gravity of the second displacement member. The shift direction of the rotation shaft of the third displacement member from the center of gravity of the third displacement member is opposite to the shift direction of the rotation shaft of the fourth displacement member from the center of gravity of the fourth displacement member.

The physical quantity sensor having this structure does not detect angular velocities and linear accelerations inputted as noise in directions around and along axes other than the detection axis, but detects only an angular velocity around the detection axis when used as an angular velocity sensor, for example. Accordingly, the physical quantity sensor can perform physical quantity detection with higher accuracy than the physical quantity sensor according to Application Example 1.

APPLICATION EXAMPLE 5

This application example of the invention is directed to the physical quantity sensor according to Application Example 4, wherein the first oscillator and the second oscillator are connected with each other via a junction spring.

According to this structure, the oscillation efficiencies of the first oscillator and the second oscillator increase.

APPLICATION EXAMPLE 6

This application example of the invention is directed to the physical quantity sensor of Application Example 4 or 5, wherein when capacitances between the fixed electrodes and the first displacement member, the second displacement member, the third displacement member, and the fourth displacement member are C1, C2, C3, and C4, respectively, the output from the physical quantity sensor is expressed as (C1+C2)−(C3+C4).

According to this structure, an angular velocity can be highly accurately detected based on a detected differential capacitance output.

APPLICATION EXAMPLE 7

This application example of the invention is directed to the physical quantity sensor of any of Application Examples 1 to 6, wherein a detection target of the physical quantity sensor is an angular velocity generated around an axis extending in the direction perpendicular to the oscillation direction in the plan view.

The physical quantity sensor having this structure does not detect angular velocities in directions around axes other than the detection axis, but detects only an angular velocity around the detection axis. Accordingly, the physical quantity sensor can perform highly accurate physical quantity detection.

APPLICATION EXAMPLE 8

This application example of the invention is directed to an electronic device including the physical quantity sensor according to any of Application Examples 1 to 7.

The electronic device according to this application example of the invention includes the physical quantity sensor capable of detecting a physical quantity with high accuracy.

BRIEF DESCRIPTION OF THE DRAWINGS

The invention will be described with reference to the accompanying drawings, wherein like numbers reference like elements.

DESCRIPTION OF EXEMPLARY EMBODIMENTS

A physical quantity sensor and an electronic device according to exemplary embodiments are hereinafter described with reference to the accompanying drawings.

Figure 1:
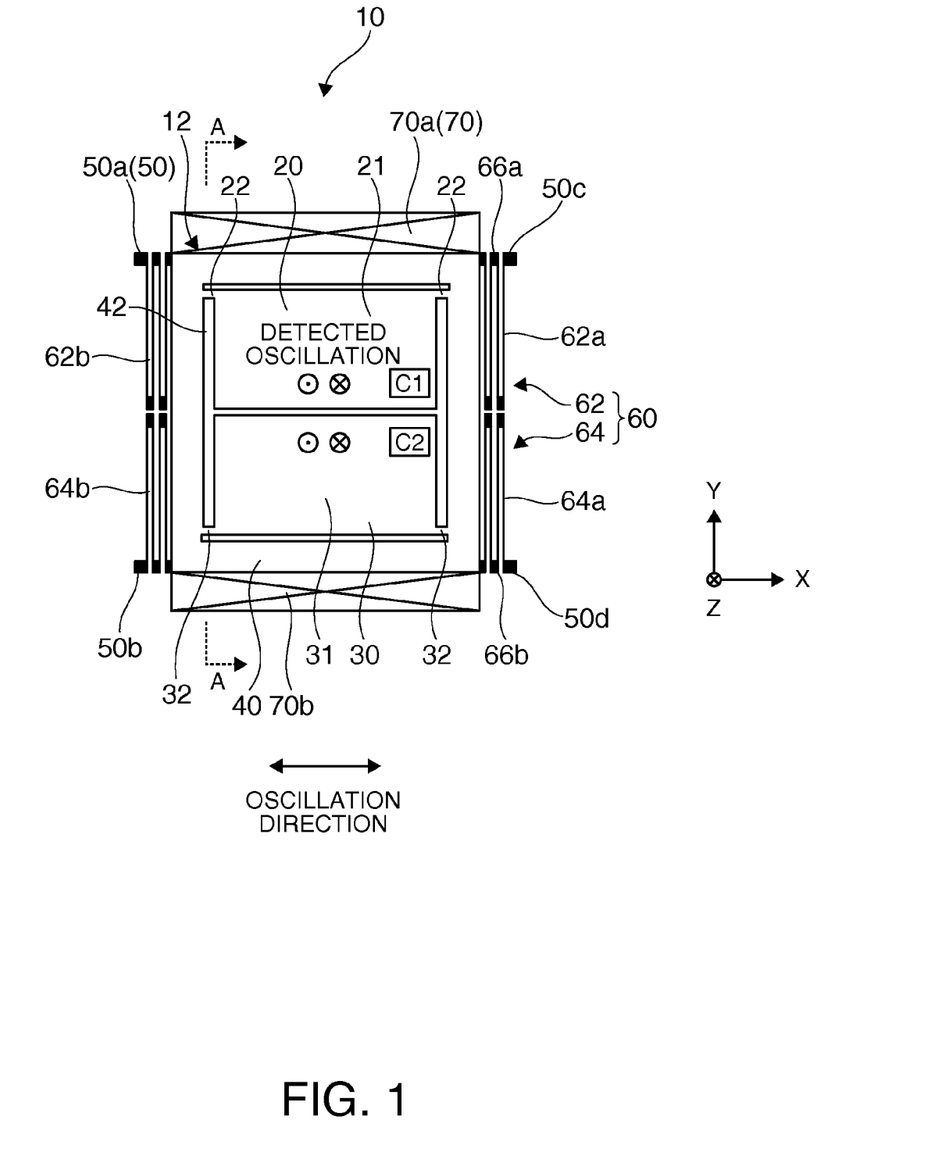
FIG. 1 illustrates the general structure of a physical quantity sensor according to a first embodiment of the invention.
Figure 2:
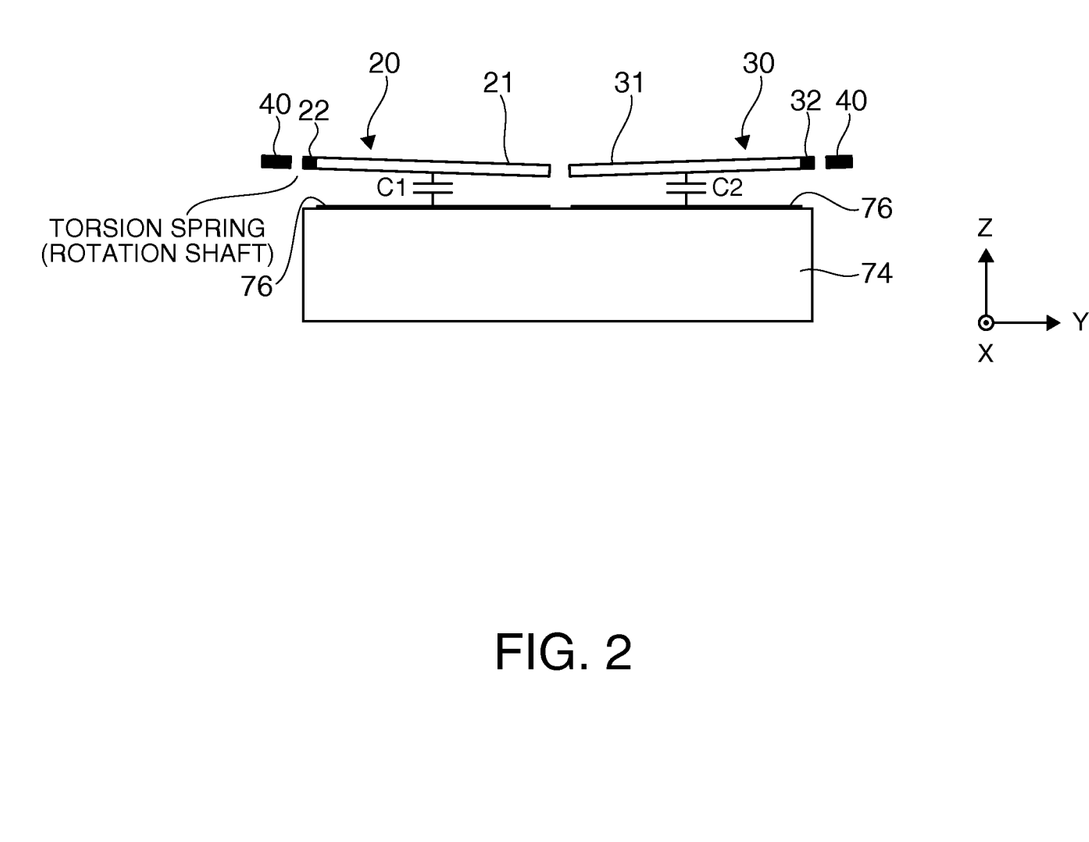
FIG. 2 is an enlarged cross-sectional view of the physical quantity sensor taken along a line A-A in FIG. 1.

FIG. 1 illustrates the general structure of a physical quantity sensor according to a first embodiment of the invention. FIG. 2 is an enlarged cross-sectional view of the physical quantity sensor taken along a line A-A in FIG. 1. The respective figures referred to herein are shown based on three axes of X axis, Y axis, and Z axis perpendicular to each other for convenience of explanation. In the following description, the direction parallel with the X axis (first axis) is referred to as an X axis direction, the direction parallel with the Y axis (second axis) is referred to as a Y axis direction, and the direction parallel with the Z axis (third axis) is referred to as a Z axis direction.

A physical quantity sensor 10 in this embodiment includes first and second displacement members 20 and 30, rotation shafts 22 and 32, a support member 40, fixing members 50, a spring unit 60 connecting the support member 40 and the fixing members 50, and a driving unit 70 as chief basic components disposed on an oscillation system structure 12. The physical quantity sensor 10 in this embodiment is a sensor which can detect an angular velocity around one of the X axis, Y axis, and Z axis. Discussed herein is the structure of an angular velocity sensor capable of oscillating in the X axis direction and detecting rotation around the Y axis as an example of the physical quantity sensor.

The oscillation system structure 12 is chiefly made of silicon as a silicon substrate (silicon wafer) on which the respective components 20 through 70 are provided as one-unit elements formed in desired external shapes by thin film forming techniques such as deposition techniques including epitaxial growth technique and chemical vapor phase growth technique, and various types of processing techniques such as etching including dry etching and wet etching. Alternatively, the respective components 20 through 70 may be formed into desired external shapes by processing only the silicon substrate after affixation between the silicon substrate and a glass substrate. The oscillation system structure 12 chiefly made of silicon obtains both excellent oscillation characteristics and excellent durability. Moreover, the oscillation system structure 12 chiefly made of silicon can be processed by fine processing techniques used for the manufacture of a silicon semiconductor device, which contributes to size reduction of the physical quantity sensor 10.

The first and second displacement members 20 and 30 have rectangular plate shapes in the X-Y plan view whose normal line extends along the Z axis, and include displacement plates 21 and 31, respectively, so constructed as to shift in the Z axis direction within the spatial plane of the X-Y plane. The displacement plates 21 and 31 are connected with the support member 40 via the rotation shafts 22 and 32. The rotation shafts 22 and 32 are disposed at positions shifted from the centers of gravity of the displacement plates 21 and 31 as illustrated in FIG. 2. The rotation shafts 22 and 32 both extend in the X axis direction corresponding to the oscillation direction. The rotation shafts 22 and 32 torsionally shift the displacement plates 21 and 31 around the rotation shafts 22 and 32 such that the displacement plates 21 and 31 can rotate in the Z axis direction when an external force is inputted.

According to this structure, the first and second displacement members 20 and 30 are attached such that their rotation directions by gravity (external force in the Z axis direction) become opposite to each other with respect to the rotation shafts 22 and 32. In other words, the first and second displacement members 20 and 30 are attached such that the direction of shift of the rotation shaft 22 from the center of gravity of the displacement plate 21 becomes opposite to the direction of shift of the rotation shaft 32 from the center of gravity of the displacement plate 31.

The support member 40 is a frame for supporting the first and second displacement members 20 and 30. The support member 40 according to the first embodiment has an opening 42 surrounding the outer peripheries of the first and second displacement members 20 and 30, and supports the first and second displacement members 20 and 30 via the rotation shafts 22 and 32 such that the oscillation sides (free end sides) of the displacement plates 21 and 31 face toward the inside. The shape of the support member 40 is not limited to the frame shape but may be any other shape.

The fixing members 50 are plural fixing parts provided outside the support member 40. According to this embodiment, the support member 40 is provided within the area surrounded by fixing parts 50a, 50b, 50c, and 50d disposed in a rectangular shape in the plan view whose normal line extends along the Z axis.

The spring unit 60 connects the support member 40 and the fixing members 50. The spring unit 60 according to the first embodiment has first and second spring members 62 and 64. The first spring member 62 is constituted by a pair of springs 62a and 62b each of which has a configuration extending in the X axis direction while reciprocating in the Y axis direction. The springs 62a and 62b are symmetrically disposed with respect to the direction extending along the Y axis and crossing the center of the support member 40 in the plan view whose normal line extends along the Z axis. These shapes of the springs 62a and 62b allow the first spring member 62 to smoothly expand and contract in the X axis direction corresponding to the oscillation direction while preventing deformation of the first spring member 62 in the Y axis direction and Z axis direction. The second spring member 64 constituted by a pair of springs 64a and 64b is disposed in such a position that the first and second spring members 62 and 64 become symmetric with respect to the direction extending along the X axis and crossing the center of the support member 40. These shapes of the springs 64a and 64b allow the second spring 64 to smoothly expand and contract in the X axis direction corresponding to the oscillation direction while preventing deformation of the second spring member 64 in the Y axis direction and Z axis direction.

The driving unit 70 has a function of oscillating the support member 40 in the X axis direction at a predetermined frequency. More specifically, the driving unit 70 oscillates the support member 40 while repeating a condition in which the support member 40 shifts in the +X axis direction and a condition in which the support member 40 shifts in the −X axis direction. Drivers 70a and 70b of the driving unit 70 each of which is constituted by not-shown driving electrode and fixed electrode are provided on the first and second displacement members 20 and 30, respectively. However, the driver may be equipped on only one of the displacement members 20 and 30 as long as it can oscillate the support member 40 in the X axis direction. The fixed electrode has a pair of comb-shaped electrode pieces disposed opposed to each other in the X axis direction with the driving electrode interposed therebetween. The driving unit 70 having this structure generates electrostatic forces between the respective driving electrodes and the respective electrode pieces when receiving voltage from a not-shown power source is applied to the electrode pieces so as to oscillate the support member 40 in the X axis direction at the predetermined frequency while expanding and contracting the spring unit 60. The driving unit 70 may use electrostatic driving system, piezoelectric driving system, electromagnetic driving system utilizing Lorentz force generated in the magnetic field, or other systems.

A substrate 74 illustrated in FIG. 2 supports the oscillation system structure 12. The substrate 74 chiefly made of silicon in this embodiment may be made of other materials such as crystal and various types of glass. The substrate 74 is a plate-shaped component having an upper surface to which the fixing members 50 are connected. This connection allows the oscillation system structure 12 to be fixed to and supported on the substrate 74. The clearance between the substrate 74 and the oscillation system structure 12 is determined long enough to avoid contact between the substrate 74 and the first and second displacement members 20 and 30 shifted by an external force. The method for connecting the substrate 74 and the oscillation system 12 may be arbitrarily selected from various types of junction methods such as direct junction and anode junction. The fixing members 50 may be disposed on components other than the substrate 74 (such as package). Lower electrodes 76 (fixed electrodes) are provided on the upper surface of the substrate 74 at positions opposed to the first and second displacement members 20 and 30. The first and second displacement members 20 and 30, and the lower electrodes 76 fixed to the substrate 74 and disposed opposed to the first and second displacement members 20 and 30 with a clearance between the lower electrodes 76 and the first and second displacement members 20 and 30 in the Z axis direction constitute a transducer.

Figure 3:
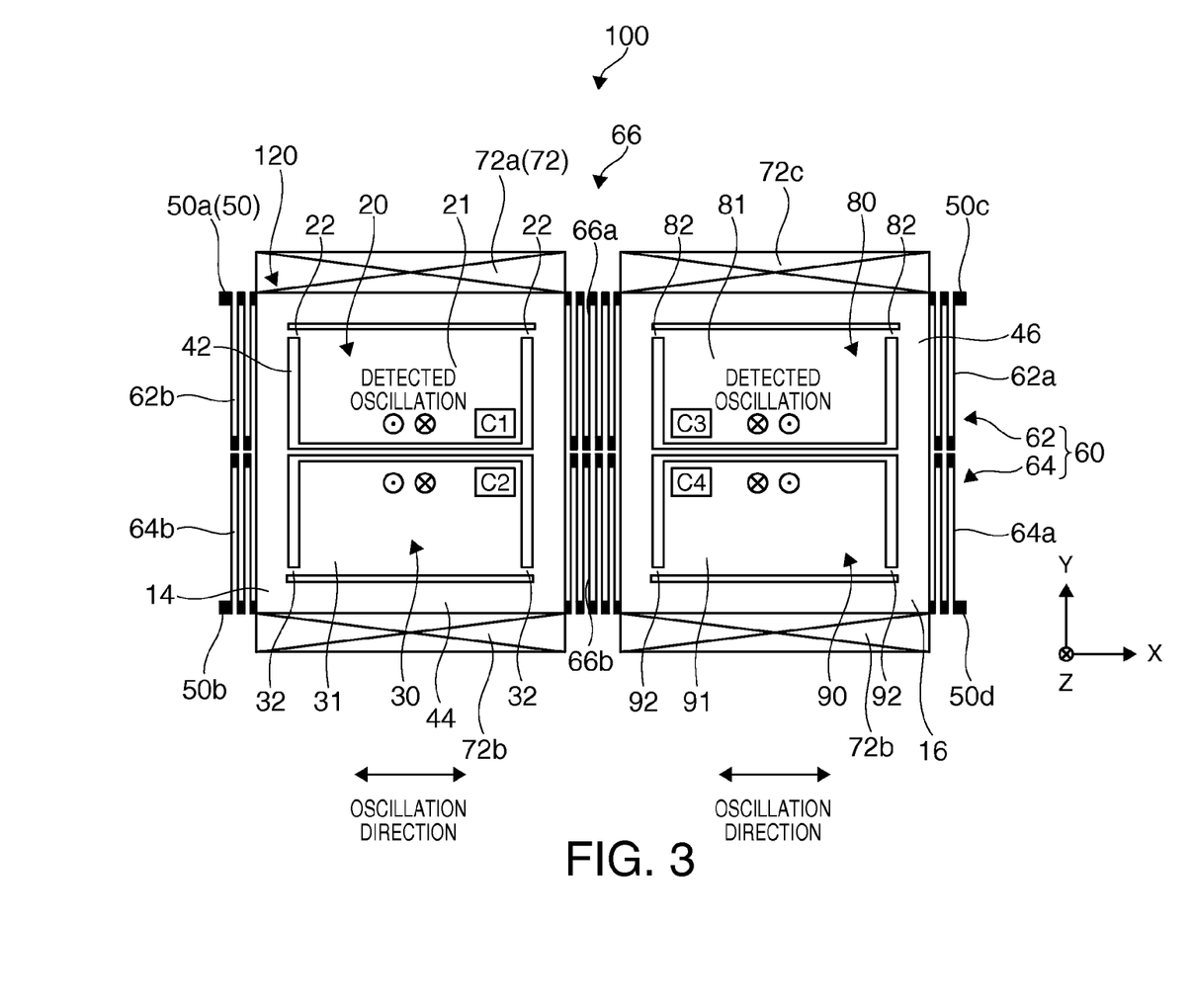
FIG. 3 illustrates the general structure of a physical quantity sensor according to a second embodiment of the invention.

FIG. 3 illustrates the general structure of a physical quantity sensor according to a second embodiment of the invention. As can be seen from the figure, a physical quantity sensor 100 in the second embodiment has two oscillators disposed on an oscillation system structure 120, and four displacement members disposed on the respective oscillators. More specifically, the physical quantity sensor 100 includes a first oscillator 14 having the first and second displacement members 20 and 30, and a second oscillator 16 having third and fourth displacement members 80 and 90. The first and second oscillators 14 and 16 are located side by side in the oscillation direction of the sensor 100. The oscillation system structure 120 is chiefly made of silicon as a silicon substrate (silicon wafer) on which the respective components are provided as one-unit elements formed in desired shapes by thin-film forming technique or various types of processing technique. Each structure of the first and second displacement members 20 and 30 is similar to the corresponding structure in the first embodiment, and is not repeatedly explained in detail herein. The basic structure of each of the third and fourth displacement members 80 and 90 is similar to each structure of the first and second displacement members 20 and 30. However, a third spring member (junction spring) is provided between the pair of the first and second displacement members 20 and 30 and the pair of the third and fourth displacement members 80 and 90. The third spring member 66 is constituted by a pair of springs 66a and 66b each of which has a configuration extending in the X axis direction while reciprocating in the Y axis direction. The springs 66a and 66b are disposed symmetric with respect to the direction extending along the X axis and crossing the centers of a first support member 44 and a second support member 46 in the X-Y plan view whose normal line extends along the Z axis. These shapes of the springs 66a and 66b allow the third spring member 66 to smoothly expand and contract in the X axis direction while preventing deformation of the third spring member 66 in the Y axis direction and the Z axis direction.

A driving unit 72 included in the physical quantity sensor 100 in the second embodiment has a basic structure the same as that of the driving unit 70 in the first embodiment. However, the driving unit 72 oscillates the pair of the first and second displacement members 20 and 30 and the pair of the third and fourth displacement members 80 and 90 in the X axis direction at the predetermined frequency and in opposite phases by applying alternating voltage to drivers 72a and 72b of the first and second displacement members 20 and 30 and drivers 72c and 72d of the third and fourth displacement members 80 and 90 in phases shifted from each other by 180 degrees and generating electrostatic forces between respective driving electrodes and respective electrode pieces, while expanding and contracting the first through third spring members 62, 64, and 66 in the X axis direction. It is possible to eliminate either one of the drivers 72a and 72b from the corresponding displacement member. Similarly, it is possible to eliminate either one of the drivers 72c and 72d from the corresponding displacement member.

Assuming that the capacitances produced between the first through fourth displacement members 20, 30, 80, and 90 and the corresponding opposed lower electrodes 76 are C1 through C4, respectively, the output of the physical quantity sensor 100 in the second embodiment is determined as (C1+C2)−(C3+C4).

Figure 4:
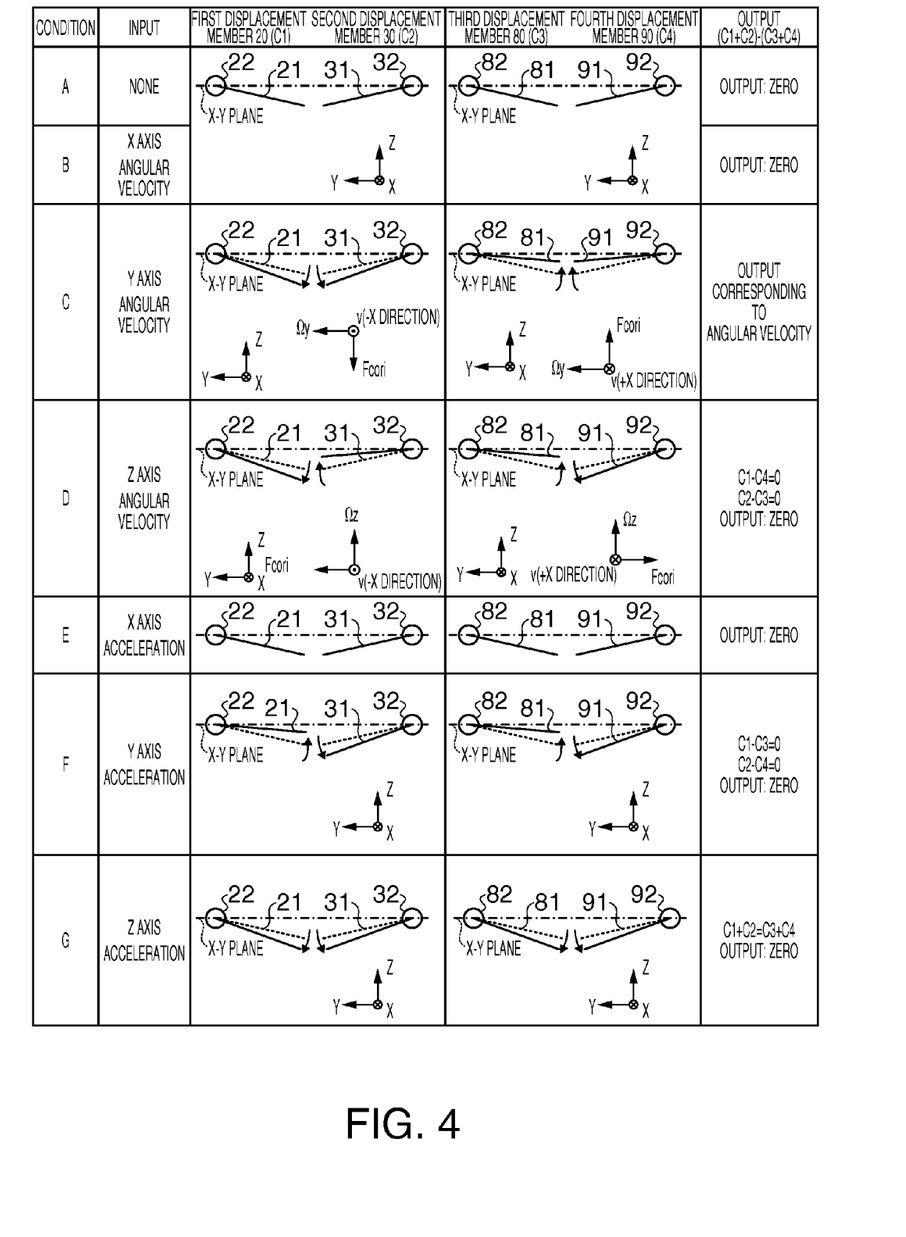
FIG. 4 illustrates operations of a physical quantity sensor.

The operations of the physical quantity sensors 10 and 100 thus constructed according to the embodiments of the invention are now explained. FIG. 4 illustrates operations performed by a physical quantity sensor corresponding to the physical quantity sensor 10 or 100. FIG. 4 shows conditions A through G corresponding to respective forces applied to the displacement members 20, 30, 80, and 90.

When the input to the physical quantity sensor is zero (condition A), the first through fourth displacement members 20, 30, 80 and 90 only become inclined by their own weights of the displacement plates because of the agreement between the oscillation direction and the respective extending directions of the rotation shafts 22 and 32 of the first and second displacement members 20 and 30 and rotation shafts 82 and 92 of the third and fourth displacement members 80 and 90. In this case, the capacity of the transducer does not change, wherefore the output becomes zero.

When an angular velocity around the X axis is inputted to the physical quantity sensor (condition B), no Coriolis force is generated because the oscillation direction and the respective axial directions of the rotation shafts 22, 32, 82 and 92 of the first through fourth displacement members 20, 30, 80, and 90 are agreed with each other. In this case, the capacity of the transducer does not change, wherefore the output becomes zero.

The condition in which an angular velocity around the Y axis is inputted to the physical quantity sensor (condition C) is now explained. It is assumed that the first and second displacement members 20 and 30 of the first oscillator 14 oscillate in the −X axis direction, and that the third and fourth displacement members 80 and 90 of the second oscillator 16 oscillate in the +X direction. Under this condition, an angular velocity around the Y axis is inputted. Generally, a Coriolis force Fcori is expressed by the following equation.

$$F\text{cori}=2\,mv \times \Omega\,(m:\text{ mass, }v:\text{ velocity, }\Omega:\text{ angular velocity})$$

When an angular velocity Ωy around the Y axis is applied to the first and second displacement members 20 and 30 oscillating in the −X axis direction, a Coriolis force in the −Z axis direction acts thereon and rotates the displacement plates 21 and 31 in the −Z axis direction. As a result, the capacitances C1 and C2 between the displacement plates 21 and 31 and the lower electrodes 76 change. On the other hand, when the angular velocity Ωy around the Y axis is applied to the third and fourth displacement members 80 and 90 oscillating in the +X axis direction, a Coriolis force in the +Z axis direction acts thereon and rotates the displacement plates 81 and 91 in the +Z axis direction. As a result, the capacitances C3 and C4 between the displacement plates 81 and 91 and the lower electrodes 76 change. Accordingly, the direction of the Coriolis force acting on the first and second displacement members 20 and 30 is recognized as opposite to the direction of the Coriolis force acting on the third and fourth displacement members 80 and 90, and therefore the output from the capacitances C1 through C4 of the first through fourth displacement members 20, 30, 80, and 90 can be calculated as (C1+C2)−(C3+C4) corresponding to the detection of capacity changes produced by the angular velocity around the Y axis.

The condition in which an angular velocity around the Z axis is inputted to the physical quantity sensor (condition D) is now explained. It is assumed that the first and second displacement members 20 and 30 of the first oscillator 14 oscillate in the −X axis direction, and that the third and fourth displacement members 80 and 90 of the second oscillator 16 oscillate in the +X direction. Under this condition, an angular velocity around the Z axis is inputted.

When an angular velocity Ωz around the Z axis is applied to the first and second displacement members 20 and 30 oscillating in the −X axis direction, a Coriolis force in the +Y axis direction acts thereon. The rotation shafts 22 and 32 of the first and second displacement members 20 and 30 are provided at positions shifted from the centers of gravity of the displacement plates 21 and 31 such that their shift directions from the corresponding centers of gravity are opposite to each other. In this case, the displacement plate 21 is pushed downward in the −Z axis direction, while the displacement plate 31 is pushed upward in the +Z axis direction. As a result, the capacitances C1 and C2 between the displacement plates 21 and 31 and the lower electrodes 76 change.

On the other hand, when the angular velocity Ωz around the Z axis is applied to the third and fourth displacement members 80 and 90 oscillating in the +X axis direction, a Coriolis force in the −Y axis direction acts thereon. The rotation shafts 82 and 92 of the third and fourth displacement members 80 and 90 are provided at positions shifted from the centers of gravity of the displacement plates 81 and 91 such that their shift directions from the corresponding centers of gravity are opposite to each other. In this case, the displacement plate 81 is pushed upward in the +Z axis direction, while the displacement plate 91 is pushed downward in the −Z axis direction. As a result, the capacitances C3 and C4 between the displacement plates 81 and 91 and the lower electrodes 76 change.

Accordingly, the output from the capacitances C1 through C4 of the first through fourth displacement members 20, 30, 80, and 90 is calculated as C1−C4=0 and C2−C3=0, wherefore (C1+C2)−(C3+C4)=(C1−C4)−(C2−C3)=0. Thus, no Coriolis force acting in the Z axis direction is detected.

When an acceleration in the X axis direction is inputted to the physical quantity sensor (condition E), the first through fourth displacement members 20, 30, 80, and 90 do not shift because the acceleration direction along the X axis agrees with the respective axial directions of the rotation shafts 22, 32, 82 and 92 of the first through fourth displacement members 20, 30, 80, and 90. In this case, the capacity of the transducer does not change, wherefore the output becomes zero.

When an acceleration in the +Y axis direction is inputted to the physical quantity sensor (condition F), the acceleration in the +Y axis direction is applied to the first and second displacement members 20 and 30 oscillating in the −X axis direction. The rotation shafts 22 and 32 of the first and second displacement members 20 and 30 are provided at positions shifted from the centers of gravity of the displacement plates 21 and 31 such that their shift directions from the corresponding centers of gravity are opposite to each other. In this case, the displacement plate 21 is pushed upward in the +Z axis direction, while the displacement plate 31 is pushed downward in the −Z axis direction. As a result, the capacitances C1 and C2 between the displacement plates 21 and 31 and the lower electrodes 76 change.

On the other hand, the acceleration in the +Y axis direction is applied to the third and fourth displacement members 80 and 90 oscillating in the +X axis direction. The rotation shafts 82 and 92 of the third and fourth displacement members 80 and 90 are provided at positions shifted from the centers of gravity of the displacement plates 81 and 91 such that their shift directions from the corresponding centers of gravity are opposite to each other. In this case, the displacement plate 81 is pushed upward in the +Z axis direction, while the displacement plate 91 is pushed downward in the −Z axis direction. As a result, the capacitances C3 and C4 between the displacement plates 81 and 91 and the lower electrodes 76 change.

Accordingly, the output from the capacitances C1 through C4 of the first through fourth displacement members 20, 30, 80, and 90 is calculated as C1−C3=0 and C2−C4=0. Thus, no acceleration acting in the Y axis direction is detected. When an acceleration in the −Y axis direction is inputted to the physical quantity sensor, the output from the capacitances C1 through C4 of the first through fourth displacement members 20, 30, 80, and 90 is similarly calculated as C1−C3=0 and C2−C4=0, wherefore (C1+C2)−(C3+C4)=(C1−C3)+(C2−C4)=0. Thus, no acceleration acting in the Y axis direction is detected.

Finally, when an acceleration in the +Z axis direction is inputted to the physical quantity sensor (condition G), the acceleration in the +Z axis direction is applied to the first and second displacement members 20 and 30 oscillating in the −X axis direction. As a result, the displacement plate 21 and the displacement plate 31 rotate in the −Z axis direction, wherefore the capacitances C1 and C2 between the displacement plates 21 and 31 and the lower electrodes 76 change. On the other hand, the acceleration in the +Z axis direction is applied to the third and fourth displacement members 80 and 90 oscillating in the +X axis direction. As a result, the displacement plate 81 and the displacement plate 91 rotate in the −Z axis direction, wherefore the capacitances C3 and C4 between the displacement plates 81 and 91 and the lower electrodes 76 change. Accordingly, the capacitances C1 through C4 of the first through fourth displacement members 20, 30, 80, and 90 are all equalized, with the output calculated as C1+C2=C3+C4. Thus, no acceleration acting in the +Z axis direction is detected. When an acceleration in the −Z axis direction is inputted to the physical quantity sensor, the capacitances C1 through C4 of the first through fourth displacement members 20, 30, 80, and 90 are all equalized, with the output calculated as C1+C2=C3+C4 similarly to the above case. Thus, no acceleration acting in the Z axis direction is detected.

For angular velocities and accelerations inputted in directions other than the axial direction corresponding to the direction of the rotation shafts, the physical quantity sensor 100 according to the second embodiment is employed. However, the physical quantity sensor 10 according to the first embodiment may also be used for those angular velocities and accelerations except for an acceleration inputted in the Z axis direction.

Accordingly, the physical quantity sensor in the first or second embodiment does not detect the angular velocities inputted around axes other than the detection axis as noise, but detects only the angular velocity around the detection axis. The physical quantity sensor thus constructed can perform highly accurate physical quantity detection.

Figure 5:
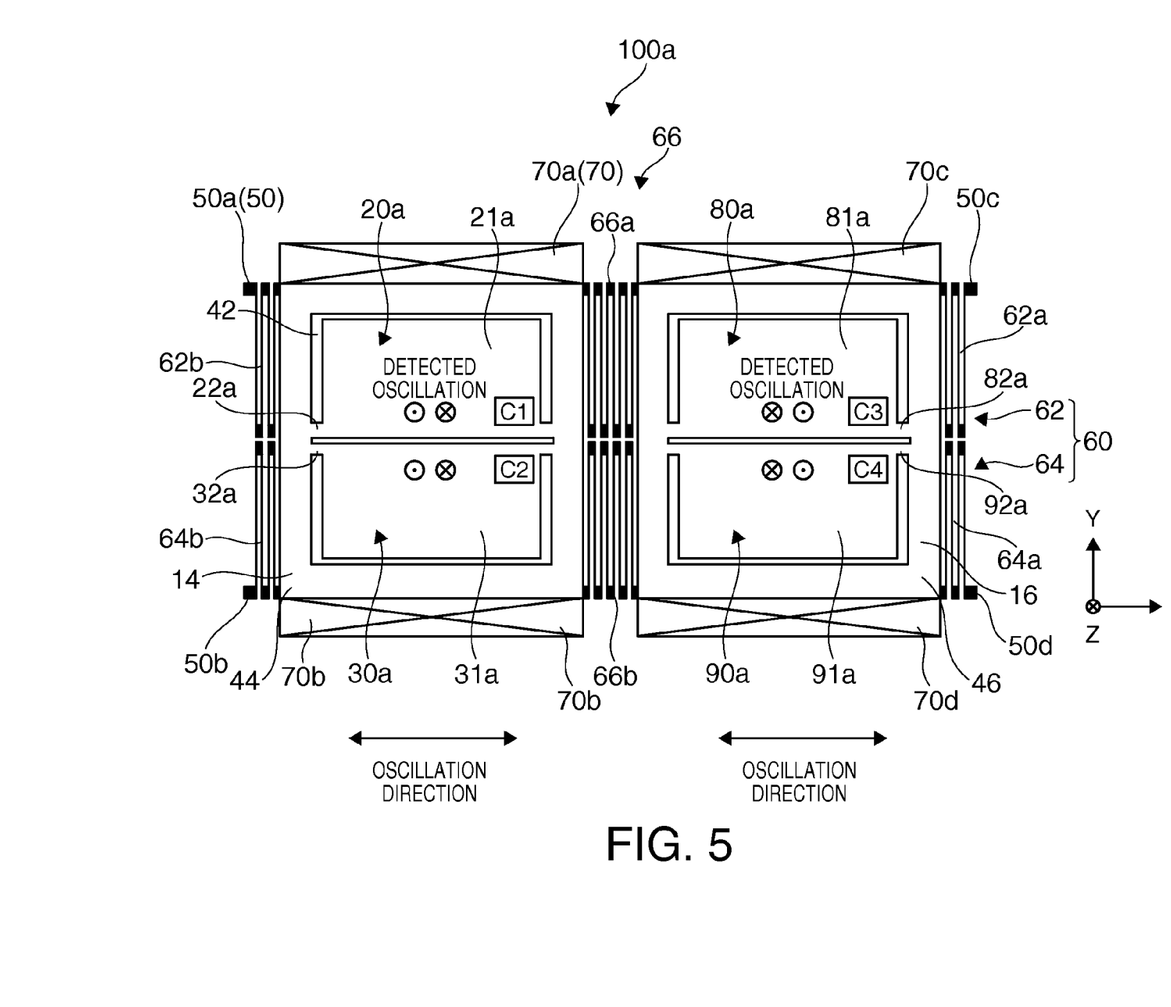
FIG. 5 illustrates the general structure of a physical quantity sensor according to a third embodiment of the invention.

FIG. 5 illustrates the general structure of a physical quantity sensor according to a third embodiment. As can be seen from the figure, a physical quantity sensor 100a in the third embodiment has first and second displacement members 20a and 30a fixed to the first support member 44 such that rotation shafts 22a and 32a of the first and second displacement members 20a and 30a are disposed on the inner side where the displacement members 20a and 30a face close to each other, and that the oscillation sides (free end sides) of displacement plates 21a and 31a are disposed on the outer side where the displacement members 20a and 30a face to the outside. Similarly, third and fourth displacement members 80a and 90a are fixed to the second support member 46 such that rotation shafts 82a and 92a of the third and fourth displacement members 80a and 90a are disposed on the inner side where the displacement members 80a and 90a face close to each other, and that the oscillation sides (free end sides) of displacement plates 81a and 91a are disposed on the outer side where the respective displacement members 80a and 90a face to the outside. The respective rotation shafts 22a, 32a, 82a, and 92a of the first through fourth displacement 20a, 30a, 80a, and 90a are disposed at positions shifted from the corresponding centers of gravity of the first through fourth displacement members 20a, 30a, 80a, and 90a. The shift direction of the rotation shaft 22a from the center of gravity of the first displacement member 20a is opposite to the shift direction of the rotation shaft 32a from the center of gravity of the second displacement member 30a. Similarly, the shift direction of the rotation shaft 82a from the center of gravity of the third displacement member 80a is opposite to the shift direction of the rotation shaft 92a from the center of gravity of the fourth displacement member 90a. Other structures are the same as the corresponding structures of the physical quantity sensor 100 in the second embodiment. These identical structures in this embodiment have been given the same reference numbers, and the same detailed explanation is not repeated.

The physical quantity sensor 100a in the third embodiment does not detect the angular velocities inputted as noise in directions around axes other than the detection axis, but detects only the angular velocity around the detection axis when used as an angular velocity sensor similarly to the above embodiments. The physical quantity sensor 100a thus constructed can perform highly accurate physical quantity detection. Moreover, the rotation shafts 22a and 32a of the first and second displacement members 20a and 30a are attached to the inner part of the first support member 44, while the rotation shafts 82a and 92a of the third and fourth displacement members 80a and 90a are attached to the inner part of the second support member 46. Thus, damage produced by contact between the respective displacement plates can be avoided.

Figure 6:
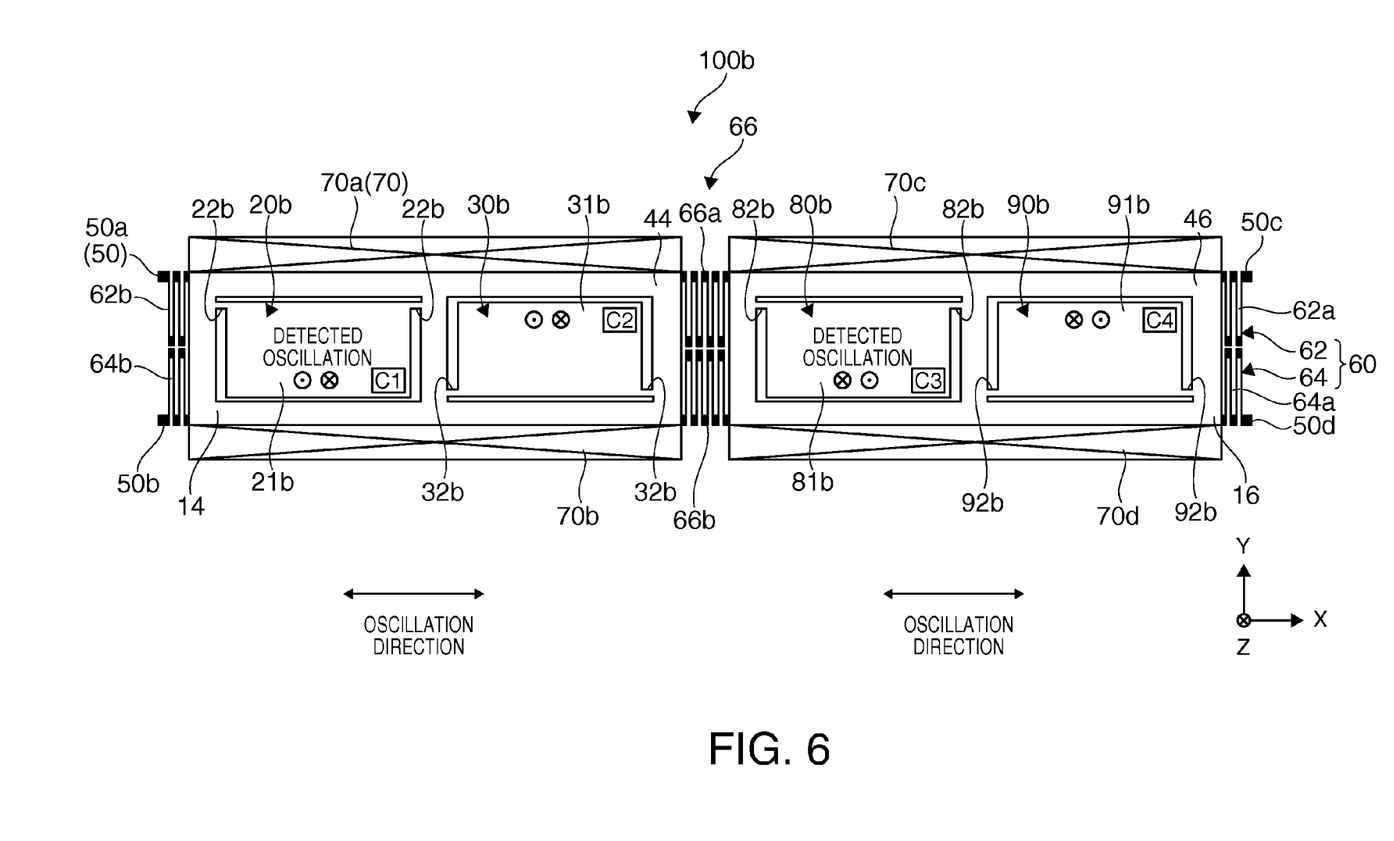
FIG. 6 illustrates the general structure of a physical quantity sensor according to a fourth embodiment of the invention.

FIG. 6 illustrates the general structure of a physical quantity sensor according to a fourth embodiment. As can be seen from the figure, a physical quantity sensor 100b in the fourth embodiment includes first through fourth displacement members 20b, 30b, 80b, and 90b disposed in a line in the X axis direction in the X-Y plan view whose normal line corresponds to the Z axis. Respective rotation shafts 22b, 32b, 82b, and 92b of the first through fourth displacement 20b, 30b, 80b, and 90b are disposed at positions shifted from the corresponding centers of gravity of the first through fourth displacement members 20b, 30b, 80b, and 90b. The shift direction of the rotation shaft 22b from the center of gravity of the first displacement member 20b is opposite to the shift direction of the rotation shaft 32b from the center of gravity of the second displacement member 30b. Similarly, the shift direction of the rotation shaft 82b from the center of gravity of the third displacement member 80b is opposite to the shift direction of the rotation shaft 92b from the center of gravity of the fourth displacement member 90b. Other structures are the same as the corresponding structures of the physical quantity sensor 100 in the second embodiment. These identical structures in this embodiment have been given the same reference numbers, and the same detailed explanation is not repeated.

The physical quantity sensor 100b having this structure in the fourth embodiment does not detect the angular velocities inputted as noise in directions around axes other than the detection axis, but detects only the angular velocity around the detection axis when used as an angular velocity sensor similarly to the above embodiments. The physical quantity sensor 100b thus constructed can perform highly accurate physical quantity detection.

Figure 7:
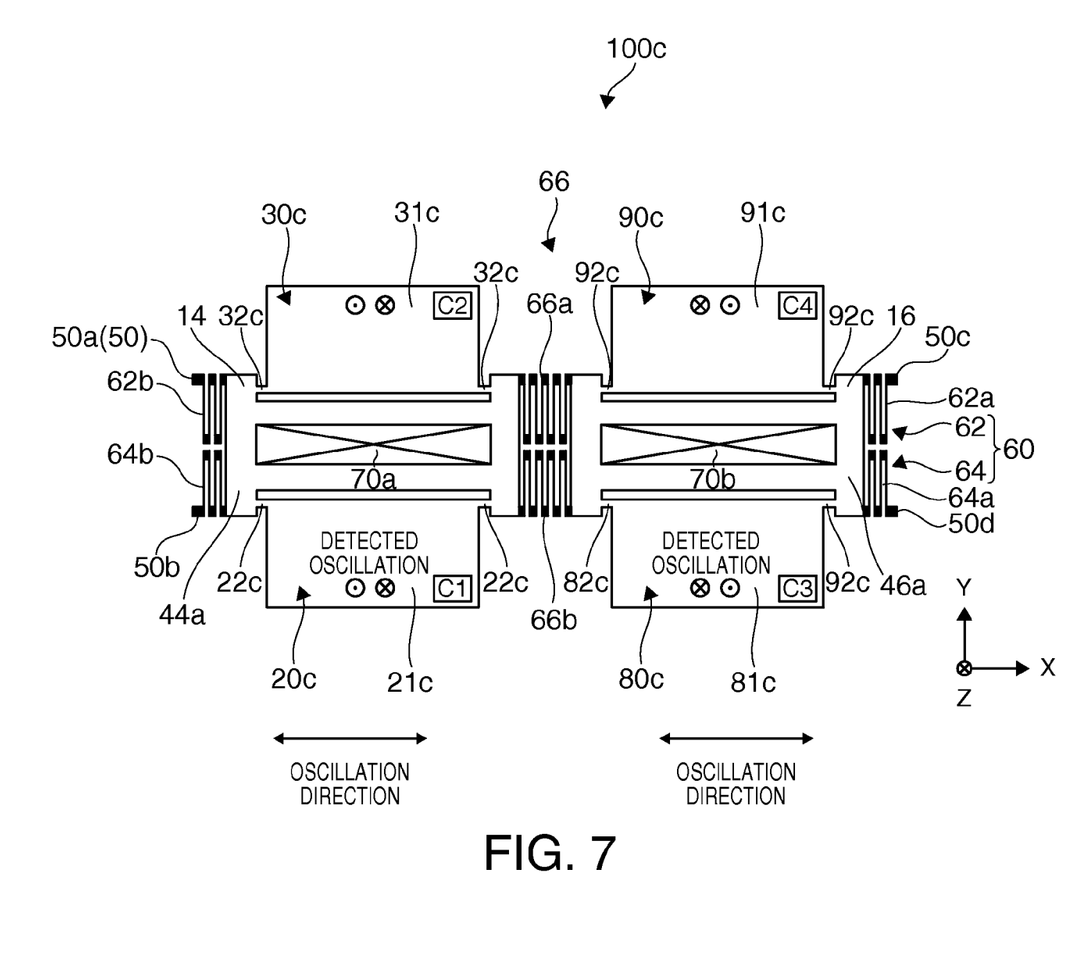
FIG. 7 illustrates the general structure of a physical quantity sensor according to a fifth embodiment of the invention.

FIG. 7 illustrates the general structure of a physical quantity sensor according to a fifth embodiment. As can be seen from the figure, a physical quantity sensor 100c in the fifth embodiment includes substantially H-shaped first and second support members 44a and 46a, and first through fourth displacement members 20c, 30c, 80c, and 90c attached to two pairs of recesses concaved in the ±Y axis direction in the X-Y plan view whose normal line corresponds to the Z axis. The drivers 70a and 70b are attached to the first and second support members 44a and 46a, respectively. Respective rotation shafts 22c, 32c, 82c, and 92c of the first through fourth displacement members 20c, 30c, 80c, and 90c are disposed at positions shifted from the corresponding centers of gravity of the first through fourth displacement members 20c, 30c, 80c, and 90c. The shift direction of the rotation shaft 22c from the center of gravity of the first displacement member 20c is opposite to the shift direction of the rotation shaft 32c from the center of gravity of the second displacement member 30c. Similarly, the shift direction of the rotation shaft 82c from the center of gravity of the third displacement member 80c is opposite to the shift direction of the rotation shaft 92c from the center of gravity of the fourth displacement member 90c. Other structures are the same as the corresponding structures of the physical quantity sensor 100 in the second embodiment. These identical structures in this embodiment have been given the same reference numbers, and the same detailed explanation is not repeated.

The physical quantity sensor 100c having this structure in the fifth embodiment does not detect the angular velocities inputted as noise around axes other than the detection axis, but detects only the angular velocity around the detection axis when used as an angular velocity sensor similarly to the above embodiments. The physical quantity sensor 100c thus constructed can perform highly accurate physical quantity detection. Moreover, since the first through fourth displacement members 20c, 30c, 80c, and 90c are attached to the outer parts of the first and second support members 44a and 46a, parasitic capacitances on wires can decrease more than those produced in a physical quantity sensor which has displacement plates within the frame of support members.

Figure 8:
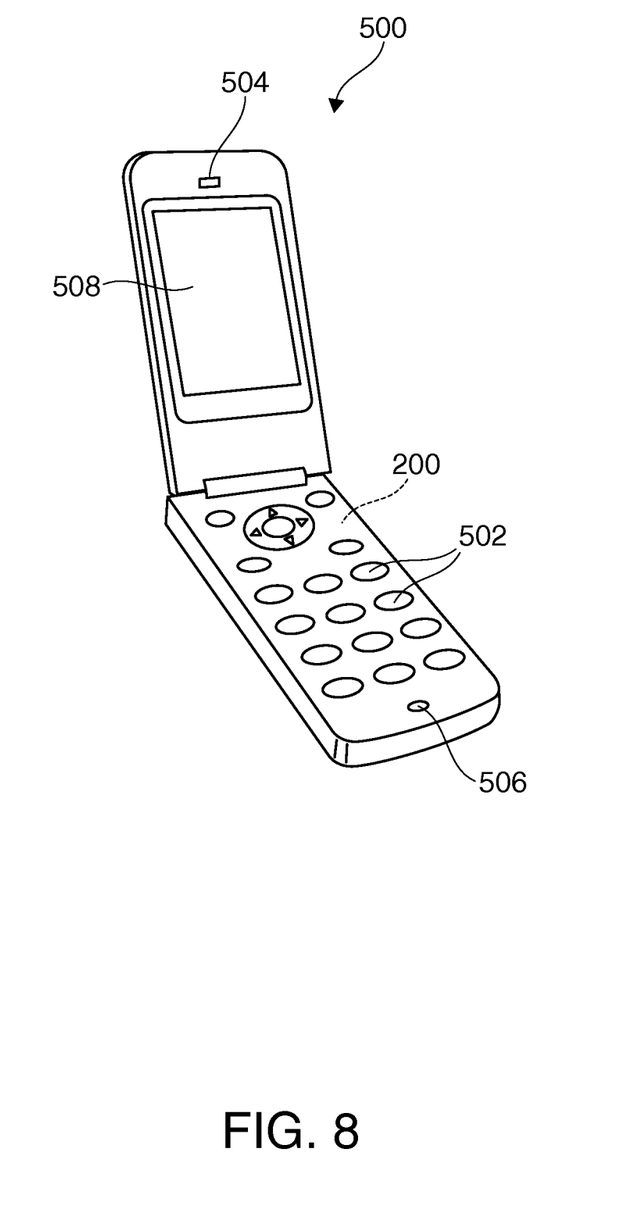
FIG. 8 illustrates a cellular phone which includes an electronic device provided with the physical quantity sensor according to some aspects of the invention.

FIG. 8 illustrates a cellular phone which includes an electronic device provided with the physical quantity sensor according to the invention. As can be seen from the figure, a cellular phone 500 includes a plurality of operation buttons 502, a receiver 504, and a transmitter 506. The cellular phone 500 further includes a display 508 disposed between the operation buttons 502 and the receiver 504. The cellular phone 500 contains any one of the physical quantity sensor 10, 100, 100a, 100b, and 100c functioning as an angular velocity detecting unit (gyro sensor).

The entire disclosure of Japanese Patent Application No. 2011-033665, filed Feb. 18, 2011 is expressly incorporated by reference herein.

What is claimed is:
1. A physical quantity sensor comprising:
   a substrate;
   a first displacement member and a second displacement member each of which is disposed in a spatial plane on the substrate and has a rotation shaft;
   fixed electrodes disposed on the substrate at positions opposed to the first displacement member and the second displacement member;
   a first support member which supports the respective rotation shafts of the first displacement member and the second displacement member and includes a beam portion between the first displacement member and the second displacement member and supported on both ends by the first support member to reduce deformation of the first support member;
   a second support member which supports a plurality of rotation shafts of a third displacement member and a fourth displacement member;

a first fixing member which supports the first support member via a first spring unit, wherein the first spring unit oscillates in an oscillation direction;

a second fixing member which supports the second support member via a second spring unit, wherein the second spring unit oscillates in the oscillation direction;

a third spring unit connecting the first support member and the second support member and oscillating in the oscillation direction, and a driving unit which oscillates the first support member in the oscillation direction, wherein each of the first displacement member and the second displacement member shifts in a direction perpendicular to the spatial plane around an axis of the corresponding rotation shaft, each of the rotation shafts of the first displacement member and the second displacement member is disposed at a position shifted from the center of gravity of the corresponding displacement member, and the shift direction of the rotation shaft of the first displacement member from the center of gravity of the first displacement member is opposite to the shift direction of the rotation shaft of the second displacement member from the center of gravity of the second displacement member.

2. The physical quantity sensor according to claim 1, wherein each of the rotation shafts is disposed in parallel with the oscillation direction of the support member.

3. The physical quantity sensor according to claim 1, wherein the first and second displacement members are symmetrically disposed.

4. The physical quantity sensor according to claim 1, wherein a detection target of the physical quantity sensor is an angular velocity generated around an axis extending in the direction perpendicular to the oscillation direction in the plan view.

5. A cellular phone, comprising the physical quantity sensor according to claim 1.

6. The physical quantity sensor according to claim 1, wherein the oscillation direction is parallel to the rotation shafts.

7. A physical quantity sensor comprising:

a substrate;

a first oscillator and a second oscillator each of which is disposed in a spatial plane on the substrate, a first spring member formed on a side of the first oscillator and connected to a first fixing member;

a second spring member formed on a side of the second oscillator and connected to a second fixing member; and a third spring member connecting the first oscillator to the second oscillator, wherein the first spring member, the second spring member, and the third spring member oscillate in an oscillation direction, wherein the first oscillator includes a first displacement member and a second displacement member each of which has a rotation shaft, and a first support member which supports the respective rotation shafts of the first displacement member and the second displacement member, the first support member includes a beam portion between the first displacement member and the second displacement member and supported on both ends by the first support member to reduce deformation of the first support member, the second oscillator includes a third displacement member and a fourth displacement member each of which has a rotation shaft, and a second support member which supports the respective rotation shafts of the third displacement member and the fourth displacement member, the physical quantity sensor further includes fixed electrodes disposed on the substrate at positions opposed to the first through fourth displacement members, a fixing member which supports the first support member and the second support member via a spring unit, and a driving unit which oscillates the first support member and the second support member, the first oscillator and the second oscillator oscillate in directions opposite to each other, each of the first through fourth displacement members shifts in a direction perpendicular to the spatial plane around an axis of the corresponding rotation shaft, each of the rotation shafts of the first through fourth displacement members is disposed at a position shifted from the center of gravity of the corresponding displacement member, the shift direction of the rotation shaft of the first displacement member from the center of gravity of the first displacement member is opposite to the shift direction of the rotation shaft of the second displacement member from the center of gravity of the second displacement member, and the shift direction of the rotation shaft of the third displacement member from the center of gravity of the third displacement member is opposite to the shift direction of the rotation shaft of the fourth displacement member from the center of gravity of the fourth displacement member.

8. The physical quantity sensor according to claim 4, wherein the third spring is a junction spring.

9. The physical quantity sensor according to claim 7, wherein when capacitances between the fixed electrodes and the first displacement member, the second displacement member, the third displacement member, and the fourth displacement member are C1, C2, C3, and C4, respectively, the output from the physical quantity sensor is expressed as (C1+C2)−(C3+C4).

10. The physical quantity sensor according to claim 7, wherein the first oscillator and the second oscillator oscillate in a direction parallel to the rotation shafts.

11. A physical quantity sensor comprising:

a substrate;

a first displacement member and a second displacement member each of which is disposed in a spatial plane on the substrate and has a rotation shaft;

fixed electrodes disposed on the substrate at positions opposed to the first displacement member and the second displacement member;

a first support member which supports the respective rotation shafts of the first displacement member and the second displacement member;

a second support member which supports a plurality of rotation shafts of a third displacement member and a fourth displacement member;

a first fixing member which supports the first support member via a first spring unit, wherein the first spring unit oscillates in an oscillation direction;

a second fixing member which supports the second support member via a second spring unit, wherein the second spring unit oscillates in the oscillation direction;

a third spring unit connecting the first support member and the second support member and oscillating in the oscillation direction, and a driving unit which oscillates the first support member in the oscillation direction and disposed between the first displacement member and the second displacement member, wherein each of the first displacement member and the second displacement member shifts in a direction perpendicular to the spatial plane around an axis of the corresponding rotation shaft, each of the rotation shafts of the first displacement member and the second displacement member is disposed at a position shifted from the center of gravity of the corresponding displacement member, the shift direction of the rotation shaft of the first displacement member from the center of gravity of the first displacement member is opposite to the shift direction of the rotation shaft of the second displacement member from the center of gravity of the second displacement member.

12. The physical quantity sensor according to claim 11, wherein each of the rotation shafts is disposed in parallel with the oscillation direction of the support member.

13. The physical quantity sensor according to claim 11, wherein the first and second displacement members are symmetrically disposed.

* * * * *